Sept. 21, 1937. M. H. MAY 2,093,467
ELECTRIC METER JUMPER DETECTOR
Filed May 20, 1937 2 Sheets-Sheet 1
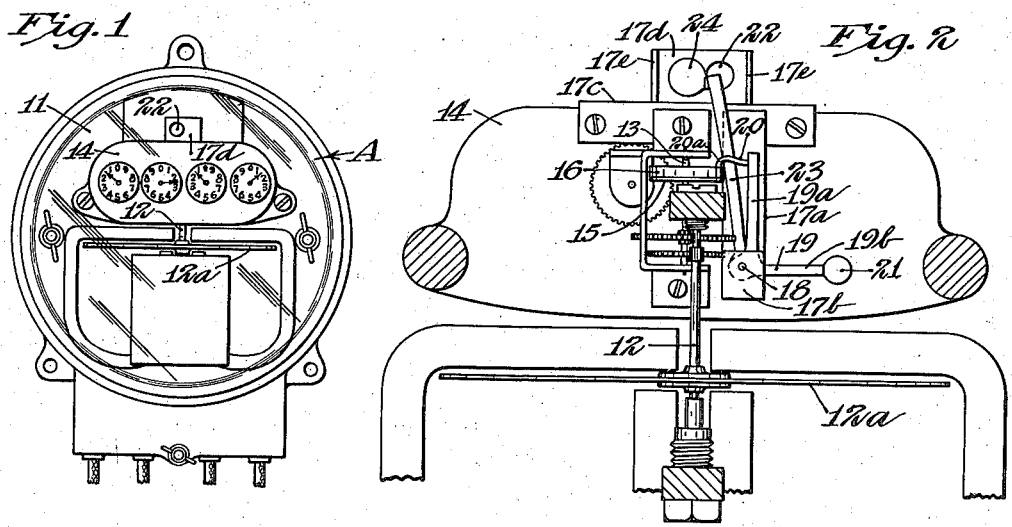
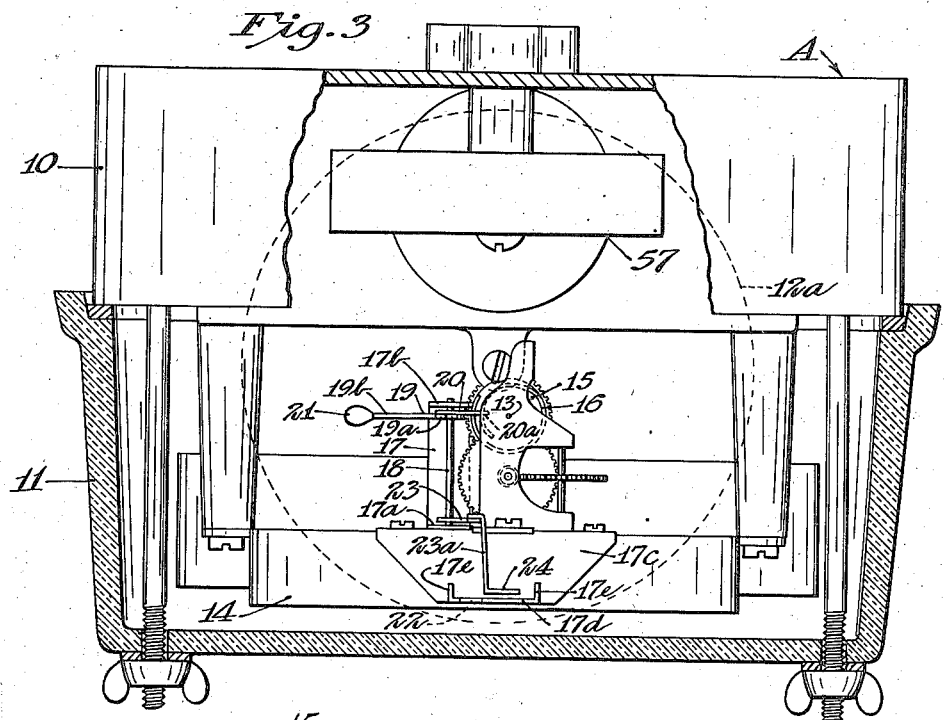
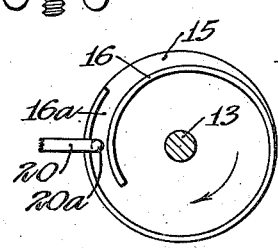
Inventor
Merle H. May
By Williamson & Williamson
Attorneys

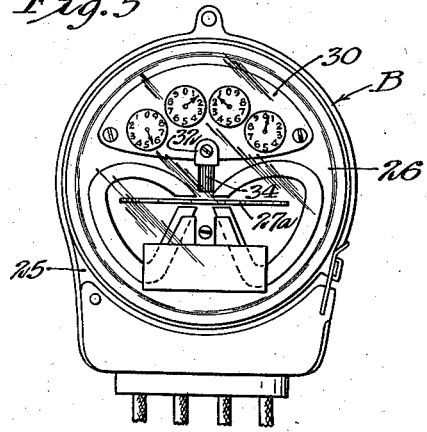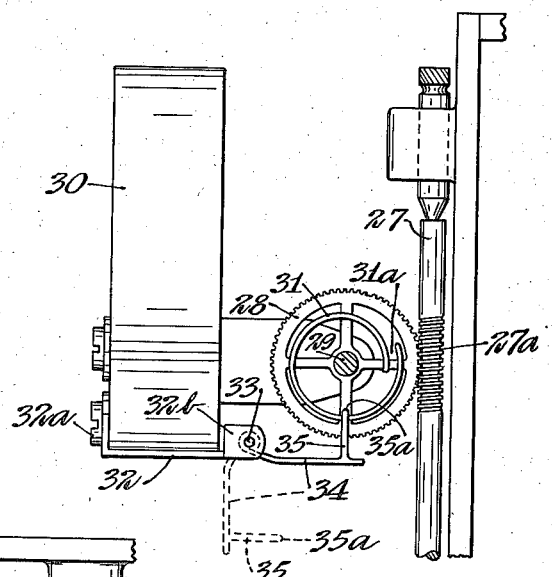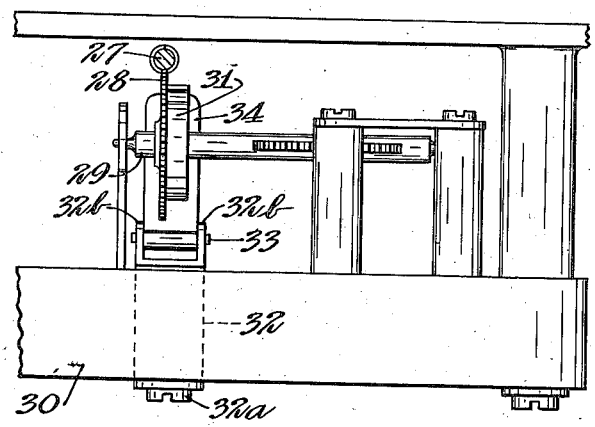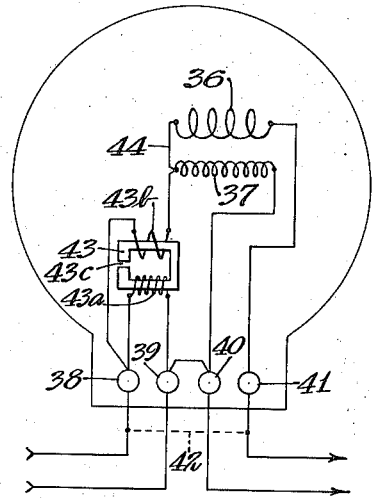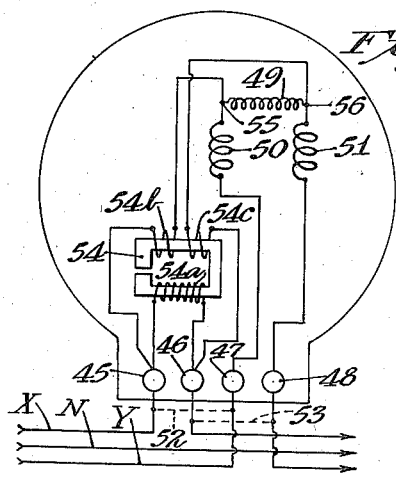

Patented Sept. 21, 1937

2,093,467

UNITED STATES PATENT OFFICE 2,093,467

ELECTRIC METER JUMPER DETECTOR

Merle H. May, Albert Lea, Minn.

Application May 20, 1937, Serial No. 143,710

3 Claims. (Cl. 171—34)

My invention relates to integrating electric meters and particularly to devices for detecting the jumpering of such meters.

It has been the practise of many dishonest customers of electric power utility companies to employ various means for causing their electric meters to record less than the actual amount of electrical energy consumed. Probably the most commonly used method of effecting theft of electrical energy consists of "jumpering" the meter, that is, making an electrical connection externally of the meter to portions of the wiring associated therewith in such manner that the current coil or circuit of the meter is shunted out of the circuit or short-circuited. Such meter jumpering is usually carried out by means of quickly removable means of such nature as to ordinarily leave no evidence of its use and the dishonest customer takes care to leave such jumpering means in use only part of the time and to remove the same whenever a visit of a meter reader or an inspector is anticipated. Obviously, the electric service companies find it very difficult to detect many of the cases of meter jumpering and, in cases where jumpering has been known or suspected to have been practised, to obtain positive evidence of such tampering.

It is a general object of my invention to provide an automatic device for detecting and providing evidence of current theft effected through jumpering of an electric meter.

A more specific object is to provide such a device adapted to be contained within and protected by the case of a meter.

Another object is to provide such a device including a visual indicating element which, when once operated, will remain in operated position until manually reset and which requires, for resetting, access to the interior of the meter with which it is associated.

Yet another object is to provide such a device including means for reversing the direction of rotation of a meter and indicating means responsive only to reversed rotation of the meter.

A further object is to provide such a device of light, compact, simple, reliable and inexpensive construction and which can be easily incorporated in the structure of an otherwise conventional type of integrating electric meter.

These and other objects and advantages of the invention will more fully appear from the following description made in connection with the accompanying drawings, wherein like reference characters refer to the same or similar parts throughout the several views, and in which:—

Fig. 1 is a general front view of a watt-hour meter wherein an embodiment of my invention is incorporated;

Fig. 2 is a part sectional rear view of a portion of the meter of Fig. 1;

Fig. 3 is a partially broken-away top view;

Fig. 4 is a detail view of certain parts as seen from above the same;

Fig. 5 is a general front view of another watt-hour meter having another embodiment of my invention incorporated therein;

Fig. 6 is a partial side view of a portion of the meter of Fig. 5;

Fig. 7 is a partial top view of a portion of the meter of Fig. 5;

Fig. 8 is an electrical connection diagram for a 2-wire, single phase, alternating current watt-hour meter having my device included therein; and Fig. 9 is an electrical connection diagram for a 3-wire, single phase, alternating current watt-hour meter having my device included therein.

My indicating means consists, in general, of an indicator which is actuated responsive to reverse rotation of the rotating parts of a meter combined with means for causing reverse rotation responsive to the establishment of an electrical connection "jumpering" the meter, that is, short-circuiting the meter terminals associated with the current coil of the meter.

Referring to the drawings, Figs. 1 to 4 inclusive illustrate one embodiment of my invention incorporated in an otherwise conventional alternating current watt-hour meter A having a base or frame 10 and a glass cover 11 together comprising a casing containing a conventional meter assembly including a vertical disc shaft 12, a vertical second shaft 13 suitably geared to the disc shaft 12, a register 14 suitably geared to the second shaft 13, and the usual type of magnetic core carrying respective current and potential coils of conventional design.

To the above generally described conventional type of electric watt-hour meter A I add indicating means designed to produce a visual indication upon the occurrence of reverse or anti-normal rotation of the second shaft 13 of the meter A and arranged to remain in indicating or operated position, even though normal rotation is resumed, until manually reset to normal or unoperated position.

Upon the second shaft 13 I provide a generally annular element substantially concentrically secured thereto to rotate therewith and having a generally spirally disposed groove or passage extending therethrough from the interior periphery to the exterior periphery thereof. I have found it convenient to form this annular element by concentrically securing a disc 15 to the shaft 13 and mounting a spirally bent flat strip 16 of sheet material, such as sheet metal or the equivalent, to the disc 15 as best seen in Fig. 4. The spiral strip 16 is secured along its lower edge to the disc 15 and extends through more than 360 degrees so as to overlap and provide a spirally extending groove or passage 16a. The normal direction of rotation of the second shaft 13 is clockwise as viewed in Figs. 3 and 4 and indicated by an arrow in Fig. 4 and the spiral shape of the strip 16 winds in such direction that an element 20 movable radially of the shaft 13 and disposed in the passage 16a will be cammed inwardly by the strip 16 when the shaft 13 is rotated in its normal direction.

A bracket 17 projects horizontally rearwardly of and is supported from the register 14 of the meter A. A horizontal pivot shaft 18 is journalled at its forward and rearward ends in suitable apertures in respective upstanding portions 17a and 17b of the bracket 17. The rear portion of the pivot shaft 18 carries a bell crank 19 having arms 19a and 19b normally projecting respectively vertically and horizontally as best seen in Fig. 2. The free end of the vertical arm 19a carries an element 20 extending toward the second shaft 13 at a level slightly above the upper edge of the cam strip 16 and projecting downwardly at its free end to form a follower 20a engaging the cam strip 16. The free end of the horizontal bell crank arm 19b carries a weight element 21 for yieldingly urging the follower 20a radially outwardly of the second shaft 13 and the camming strip 16. Normally the follower 20a is disposed inwardly of the camming strip 16 and bears outwardly thereagainst. During forward (normal) rotation of the second shaft 13 the follower 20a will be retained within the camming strip 16 but, during the first revolution of reverse (anti-normal) rotation of the second shaft 13, the follower 20a will pass through the spiral passage 16a and be released from influence of the camming strip 16 to be shifted outwardly therefrom by the pull of gravity on the weight 21.

Suitable indicating means, preferably of a visual nature, is associated with the pivot shaft 18 to be operated by the outward movement of the follower 20a resulting from reverse rotation of the second shaft 13. The forward upstanding portion 17a of the bracket 17 is extended upwardly along and is suitably secured to the rear side of the register 14 and is further extended forwardly at 17c over the upper side of the register 14 and then upwardly in generally flush relation with the front face of the register 14 to form an upstanding member 17d. The marginal portions along the vertical edges of the upstanding member 17d are bent rearwardly to form ears 17e. The left-hand portion (as viewed in Figs. 1 and 3) of the upstanding member 17d is provided with a viewing aperture 22.

A generally upwardly extending arm 23 is mounted on the pivot shaft 18 and is provided at its upper end with a forwardly projecting extension 23a on the forward end of which is secured a disc 24 disposed closely behind and parallel to the upstanding member 17d and comprising an indicating target for cooperation with the viewing aperture 22. The arm 23 and its extension 23a are so proportioned and arranged that, under normal conditions when the follower 20a is disposed inwardly of the camming strip 16, the target 24 will be disposed behind and concealed by the unapertured right-hand (as viewed in Figs. 1 and 3) portion of the upstanding member 17d and, when the follower has reached a position outwardly of the camming strip 16 will be disposed behind and visible through the viewing aperture 22. It should be obvious that reverse rotation of the rotating elements of the meter will cause appearance of the target 24 in registration with the viewing aperture 22. Also it is to be noted that the weight 21 will hold the target in operated or indicating position even though normal forward rotation of the rotatable elements of the meter A be resumed subsequent to reverse rotation. Resetting of the target 24 may be accomplished by manually urging the same toward normal non-indicating position while manually rotating the disc 12a of the meter forwardly through a suitable number of revolutions. The left-hand (as viewed in Fig. 3) one of the ears 17e on the upstanding member 17d functions as a stop to limit leftward movement of the target 24 when the same has been operated. Preferably the front face of the target 24 should be rendered relatively conspicuous by the application thereto of suitable coloring matter.

Figs. 5 to 7 inclusive illustrate another embodiment of my invention as applied to a watt-hour meter B which is arranged somewhat differently than the meter A shown in Figs. 1 to 4 and which includes a frame or base 25 and a glass cover 26 which together comprise a meter casing, a vertical disc shaft 27 having worm gear threads 27a thereon driving a gear 28 mounted on a second shaft 29 which, in turn is suitably geared to a register 30.

A generally spirally extending camming strip 31 is carried by the second shaft 29 in generally concentric relation thereto as by securing an edge of the strip 31 to the gear 28. The gear 28 normally rotates in a counter-clockwise direction, as viewed in Fig. 6 and the camming strip 31 is spiralled in such direction as to tend to displace an element bearing against the inner side thereof inwardly during such rotation. A bracket 32 is secured to the lower front portion of the register 30 by suitable means such as the screw 32a and extends rearwardly to a point behind the rear side of the register 30. The rear end of the bracket 32 is formed into a pair of horizontally spaced, apertured ears 32b through which a pivot pin 33 extends. Between the ears 32b the forward end of a normally rearwardly projecting and horizontally disposed plate 34 is pivotally mounted on the pivot pin 33. The rear portion of the plate 34 carries a normally vertically upwardly projecting element 35 extending closely past the free edge of the lower portion of the camming strip 31 and which is, at its free end, bent toward the gear 28 to form a follower 35a normally engaging the inner side of the lower portion of the camming strip 31 to support the plate 34 in horizontal position as shown in full lines in Fig. 6. Obviously the follower 35a will remain in a position inwardly of the camming strip 31 during normal (counter-clockwise) rotation of the second shaft 29 but, during the first revolution of reverse (clockwise) rotation, will pass through the spirally disposed groove or passage 31a to permit dropping of the plate, responsive to the pull of gravity, to a depending position thereof as shown in dotted lines in Fig. 6 and in full lines in Fig. 5. The plate 34 functions as an indicating target which is not visible from the front of the meter B when in horizontal position but which can be seen immediately below the register 30 when in released or depending position as the result of reverse rotation of the rotating elements of the meter B. Preferably the side of the plate 34 facing the front when in depending position should be rendered relatively conspicuous by the application thereto of suitable coloring matter.

The target 34 may be reset to its normal or unoperated position by manually raising the same to bring the follower 35a into engagement with the camming strip 31 and rotating the disc 27a of the meter B in its normal direction of rotation until the follower 35a has been received in the passage 31a defined by the overlapping end portions of the camming strip 31.

Means for causing the rotating parts of each of the meters A and B to rotate in a reverse or anti-normal direction responsive to jumpering of the meter is provided for co-operation with the reverse rotation indicating devices described above. Figures 8 and 9 diagrammatically illustrate such means for use respectively in 2-wire and 3-wire, single phase, watt-hour meters.

Fig. 8 comprises an electrical connection diagram of a conventional watt-hour meter having a current coil 36, a potential coil 37, line terminals 38 and 39, and load terminals 40 and 41, of which the terminals 38 and 41 are associated with the current coil 36 and are connected together externally of the meter, as indicated by the dotted line 42, when a dishonest electrical energy consumer desires to render the meter inoperative.

In accordance with my invention, I place a small transformer 43 within the casing of the meter and connect the primary winding 43a of the transformer 43 to the line terminals 38 and 39 so as to excite the transformer 43 from line potential ahead of the meter coils. The secondary winding 43b of the transformer 43 is connected between the line terminal 38 and the usual common connection 44 to the current and potential coils 36 and 37. The transformer 43 is connected in such phase relation as to constitute a bucking transformer but the voltage for which the secondary winding 43b is wound is sufficiently low that the magnitude of the bucking voltage is substantially negligible relative to the magnitude of the line voltage. The transformer 43 is preferably arranged to have a relatively high leakage reactance as, for example, by providing an air gap 43c in the core thereof.

It should be apparent that making a jumper connection such as that indicated by the dotted line 42 will prevent normal current flow through the current coil 36 and thus prevent recording of electrical energy flowing through a circuit in in which the meter is connected. However, with the transformer 43 provided as described, the jumper connection 42 will complete a circuit through which the transformer secondary winding 43b will pass current through the current coil 36 in a direction opposite to the normal direction of current flow in the coil 36. This antinormal or reverse flow of current through the current coil 36 will obviously cause the rotating parts of the meter to rotate in a direction opposite to normal so as to operate the reverse rotation indicating device, which when once operated, will remain in operated position even though the jumper connection 42 is removed and the meter resumes normal metering operation.

Fig. 9 illustrates the application of a transformer to a 3-wire, single phase, alternating current watt-hour meter to cause reverse rotation of the rotating parts of the meter responsive to establishment of electrical connections jumpering the meter. The meter of Fig. 9 is of the type adapted for use with a 3-wire, 115–230 volt alternating current circuit such as indicated in Fig. 9 by the outer wires X and Y and the neutral wire N. The meter has line terminals 45 and 46, load terminals 47 and 48, a potential coil 49 normally connected through the line terminals 45 and 46 to the line wires X and Y, one current coil 50 connected in series with line wire X through line terminal 45 and load terminal 47, and another current coil 51 connected in series with line wire Y through line terminal 46 and load terminal 48. Jumpering of this meter is accomplished by establishment of either or both of the connections shown in dotted lines at 52 and 53 so as to short circuit one or both of the current coils 50 and 51.

In the meter of Fig. 9 I install a transformer 54 having a primary winding 54a suited for the voltage existing between line wires X and Y and two secondary windings 54b and 54c, the transformer otherwise being substantially identical with the transformer 43 of Fig. 8. The secondary winding 54b is connected between the line terminal 45 and the common input connection 55 to the current coil 50 and one end of the potential coil 49. The other secondary winding 54c is connected between the line terminal 46 and the common input connection to the current coil 51 and the remaining end of the potential coil 49. Each of the secondary windings 54b and 54c is connected in such phase relation to the circuit with which it is associated as to produce a current in the corresponding one of the current coils 50 and 51 flowing in a direction opposite to the normal direction of current flow when jumper connections such as 52 and 53 are established.

The transformers 43 of Fig. 8 and 54 of Fig. 9 are preferably mounted within the casings of the meters with which they are used as, for example, in the manner of the transformer 57 shown within the meter A in Fig. 3.

Since all of the parts of my indicating device are situated within the casing of the meter with which the device is associated, it is apparent that the device is safeguarded from tampering by the sealing devices which are customarily employed to seal the case of the meter.

While my combination of a reverse rotation detector and a transformer connected to cause reverse rotation in a jumpered meter are described as applied to an ordinary single phase, alternating current, direct connected watt-hour meter such as ordinarily used for domestic service, it should be apparent that my jumper detecting combination may be readily adapted for use with polyphase meters, meters connected to the line through instrument transformers, ampere-hour meters, reactive-volt-ampere hour meters, or any other device having rotating elements rotated by one or more current coils.

Furthermore, my reverse rotation detector, without the transformer, is useful where an electrical energy customer has generating equipment connectible to a metered circuit and it is desired to detect any case where the customer causes his generating equipment to deliver energy back into the lines of the electric service company.

It is apparent that I have invented novel, effective, compact, rugged, reliable and inexpensive apparatus for detecting reverse rotation of an integrating electric meter and current theft effected by meter jumpering.

It will, of course, be understood that various changes may be made in the form, details, arrangement, and proportions of the various parts without departing from the scope of my invention.

What is claimed is:—

1. In combination with a rotatable member normally rotated in a predetermined direction, mechanism for establishing an indication of the occurrence of reverse rotation of said member comprising, a generally annular element carried by said member in generally concentric relation thereto to rotate therewith, said element having a substantially spirally extending passage therethrough between its inner and outer peripheries, a follower shiftable radially inwardly and outwardly of said element and having a portion bearing against one of the peripheries of said element and adapted for movement through said passage, said passage being spiralled in such direction that said portion may pass therethrough only during reverse rotation of said member, and an indicating element so connected to said follower as to be operated by movement of said follower through said passage.

2. The combination defined in claim 1 and said follower being free for outward movement beyond the limits of said annular element to prevent automatic return of said follower to normal position responsive to resumption of forward rotation of said annular element subsequent to reverse rotation thereof.

3. In combination with an electrical integrating meter adapted to be connected in an electrical supply circuit to meter the flow of energy therein and including a current coil and a member rotatable in response to flow of electrical energy through said coil, means in said meter for causing reverse rotation of said member responsive to establishment of connections jumpering said meter, an element carried by said member in spirally disposed relation to the axis thereof and arranged to rotate with said member, a follower normally engaging the inner side of said element and shiftable inwardly and outwardly thereof, said element being spiralled in such direction as to tend to progress said follower inwardly and outwardly responsive to respective normal and reverse rotations of said member, yieldable means urging said follower outwardly, and indicating means associated with said follower to be actuated by the same responsive to outward movement thereof.

MERLE H. MAY.